United States Patent Office 3,686,250
Patented Aug. 22, 1972

3,686,250
PROCESS FOR PRODUCING HIGH PURITY STRAIGHT CHAIN ALUMINUM ALKYL COMPOUNDS FROM OLEFIN MIXTURES CONTAINING VINYL OLEFINS AND NON-VINYL OLEFINS
Carroll W. Lanier, Baker, La., assignor to Ethyl Corporation, New York, N.Y.
No Drawing. Filed Sept. 29, 1969, Ser. No. 862,062
Int. Cl. C07f 5/06
U.S. Cl. 260—448 A                    20 Claims

ABSTRACT OF THE DISCLOSURE

It is disclosed that the production of first hydrocarbo aluminums in which the hydrocarbon radicals thereof have from about 4 to about 30 carbon atoms each and in which the hydrocarbon radicals are linked to aluminum via a terminal carbon atom involving a reaction of alpha olefins with second hydrocarbo aluminums and where the alpha olefins supplied contain at least a detectable percentage of proximately branched alpha olefins, is improved by subjecting the alpha olefins supplied to the process to a selective catalytic isomerization whereby the proximately branched alpha olefins are substantially selectively converted to tri-substituted ethylenes, and then subjecting the olefins from the isomerization to a selective reaction with the second hydrocarbo aluminums whereby remaining alpha olefins add to aluminum-hydrogen bonds to form first hydrocarbo aluminums and the tri-substituted ethylenes remain substantially unreacted.

BACKGROUND OF THE INVENTION

Field of the invention

This invention relates to reactions of organometallic compounds such as those of aluminum, boron or magnesium with olefinic systems and in particular a process for obtaining a selective reaction of hydrocarbo aluminum compounds with olefins when the olefins as supplied are in admixture with proximately branched alpha olefins with or without internal olefins. In greater particularity, it relates to improvements wherein reaction of the vinylidene olefins is virtually avoided by performing a preceding selective isomerization of proximately branched olefins to tri-substituted ethylenes which are less reactive with the hydrocarbo aluminum compounds than the proximately branched olefins.

In these reactions the olefins react with aluminum-hydrogen bond systems of mixed or pure compounds, typically tri-isobutyl aluminum, tri-n-butyl aluminum, tri-n-dodecyl aluminum, di-iso-butyl aluminum hydride, di-n-hexyl aluminum hydride and the like.

Description of the prior art

Reactions of olefins with aluminum-hydrogen bond systems are disclosed in Annalen der Chemie 629, 14–19 (1960), Organometallic Compounds XXVII. "Aluminum Trialkyls and Dialkyl Aluminum Hydrides From Isobutyl Aluminum Compounds" by Karl Ziegler, Heinz Martin and Felix Krupp. That reference discloses the "displacement" of branched alkyl groups from various trialkyl aluminum compounds, typically triisobutyl aluminum, using selected olefins to provide new trialkyl aluminum compounds having selected organic groups corresponding to the carbon skeleton structure of the selected olefins. It is disclosed that this reaction involves a two-step procedure of "splitting-off" of original organic groups of the aluminum organic compounds to form olefins plus aluminum-hydrogen bond compounds such as di-isobutyl aluminum hydride or dihexyl aluminum hydride which then react on statistical and probability bases with the selected olefins present in the system in an "addition" reaction of olefins to aluminum-hydrogen bonds to produce the new trialkyl hydrocarbo aluminum compounds.

It is known that dialkyl aluminum hydrides react in similar fashion and in addition add olefins at the pre-existing aluminum-hydrogen bond without requiring an initial splitting-off operation with respect to that particular bond.

In the foregoing publication and in others, Ziegler discloses that there are differences in the reaction rates of olefins of the foregoing various types with aluminum-hydrogen bonds leading to selective reactivity teachings such as that of U.S. Patent 3,291,853. This latter patent seeks to recover primary alpha olefins (vinyl) from mixtures containing 1,1-dialkyl ethylene type olefins (vinylidene olefins). According to the theory of that patent, a selectivity of reaction can be obtained wherein all one needs to do is to supply enough aluminum alkyl material to react with all the primary alpha olefin, the 1,1-dialkyl ethylene type olefins then remaining unreacted. Unfortunately, such a theoretical situation prevails in actuality to only a limited extent in certain important areas. Where one seeks to recover all vinyl olefins and to obtain a purity in excess of about 95 percent with respect to un-branched primary alkyl trialkyl aluminum compounds, the process of the patent is of limited utility, if any, because the 1,1-dialkyl ethylenes still add to the aluminum-hydrogen bonds in intolerable quantities.

OTHER PRIOR KNOWLEDGE

Although such is not prior art, U.S. Patent 2,976,306 seeks to obtain the reaction of all olefins recognizing that some olefins are more difficult to get to react than are others.

Another reference in the general area is U.S. Patent 3,322,806 which seeks to obtain reactivity of internal olefins with alkyl aluminum compounds.

The general reaction of olefins and aluminum alkyls is also shown by U.S. Patents 2,987,535; 3,282,974; 3,014,941; and 3,180,881.

A highly preferred process for reacting olefins with various aluminum-hydrogen bonds particularly those of alkyl aluminum compounds such as triisobutyl aluminum is the counter-current process of U.S. Patent 3,389,161. In general, the counter-current process of this latter patent is preferred for the present displacement reaction.

It is accordingly an object of the present invention to provide an improvement wherein the selective reaction of vinyl olefins with aluminum hydrogen bonds can be enhanced overall relative to vinylidene olefins to provide straight chain alkyl trialkyl aluminum compounds of high primary (vinyl) purity virtually free of branched chain primary alkyl structures.

Another object of the present invention is to provide a process for a selective reaction of vinyl olefins and of remotely branched alpha olefins with hydrocarbo aluminum compounds wherein reaction of proximately branched alpha olefins is avoided by performing a preliminary selective isomerization of the proximately branched alpha olefins to tri-substituted ethylenes.

Other objects in accordance with the foregoing objects relate to similar reactions of hydrocarbo compounds of magnesium and boron.

Another object of the present invention is to provide improved purity of straight chain primary alcohols produced by aluminum alkyl chemistry involving the oxidation of trialkyl aluminum compounds followed by hydrolysis of the oxidation product.

Another object of the present invention is to provide a process for producing high purity vinyl olefins.

Another object of the present invention is to provide a process of selective isomerization of vinylidene type olefins when in the presence of vinyl type olefins which latter olefins are virtually unaffected.

Other and further objects and features of the present invention will become apparent upon a careful consideration of the following discussion.

SUMMARY OF THE INVENTION

The invention is summarized and defined primarily with respect to reactions readily visualized for typical olefins and aluminum alkyl compounds.

In an exemplary aspect the invention is directed to improving the purity of unbranched primary alkanols, of alkanoic acids, of dibasic acids, of diols, of glycols, of polyols, of unbranched terminal olefins and various derivatives of such materials where there is production history involving either olefins or metal alkyls. Typical processes of such production history involve the aluminum chemistry processes of hydroalumination, polymerization, chain growth, displacement, and oxidation or carboxylation based on aluminum alkyls, hydrolysis of aluminum alkoxides or carboxylates and if desired oxidation of hydrolysis-produced alkanols or polyols having two or more hydroxyl groups per molecule to produce alkanoic acids, dibasic acids, hydroxy acids and the like, either directly or indirectly via reaction involving the formation of salts of alkali or alkaline earth metals. Other typical processes involve the production of aldehydes or alkanols or alkanoic acids by the oxo process reaction of olefins with carbon monoxide with or without water and with or without hydrogenation. Other typical processes include hydration of olefins to produce alkanols or polyols.

The present process contemplates a condition wherein all materials used in such prior processes are brought through an olefinic or dienic or polyenic state and are used to form organometallic compounds wherein a selective reaction can be conducted to produce organometallic compounds such as aluminum alkyls which are virtually pure with respect to freedom from proximate branching of the carbon skeletons and freedom from linkage of the metal to carbon atoms other than terminal carbon atoms of carbon skeletons. The significance of avoidance of proximate branching is that control over such materially reduces the contamination by such materials specifically but in many instances also reduces the contamination by remotely branched compounds produced from the proximately branched compounds.

Such a selective reaction makes it possible to minimize the amount of branched structures of all types present in chain grown aluminum alkyl compounds and in the various materials of the foregoing types produced from them either directly or indirectly and permits the recovery of the non-vinyl olefins without complicated processing or manipulation of aqueous system or solvents.

The process of the present invention recognizes that there have been prior art teachings of selectivity of reaction of olefins with aluminum-hydrogen bonds to provide a selective recovery of vinyl olefins from mixtures also containing internal olefins and vinylidene olefins. The present concept does emphasize; however, the limitation that, as such prior art forms of recovery of vinyl olefins progresses to a point where the environment becomes preponderantly proximately branched alpha olefins or mixtures of such with internal olefins, the selectivity of reaction of the vinyl olefins relative to the proximately branched olefins is not adequate to overcome the probability brought about by the adverse concentration ratio so that inevitably a point is reached at which the proximately branched olefins react in undesired quantities. For the purposes of the present invention, unbranched alpha olefins (vinyl olefins) are equivalent to remotely branched alpha olefins with respect to isomerization and selective reactions with organometallic compounds.

The present invention avoids the problem of adverse concentrations and reactivity of proximately branched alpha olefins by first subjecting the olefin mixture containing proximately branched alpha olefins (vinylidene olefins), plus one or both of unbranched alpha olefins (vinyl olefins) and remotely branched alpha olefins, either with or without internal olefins to a selective isomerization reaction wherein the vinylidene olefins are converted to tri-substituted olefins without significantly altering the co-present vinyl olefins or the remotely branched alpha olefins and without requiring aqueous or hydrocarbon solvents that complicate recovery of the nonvinyl olefins. Then the second step of selective reaction of vinyl olefins or remotely branched alpha olefins with aluminum-hydrogen bonds is conducted with the result that the tri-substituted olefins do not react with the aluminum-hydrogen bonds as readily as their proximately branched precursors or even as readily as unbranched or remotely branched internal olefins. Thus the result aluminum alkyl compounds are virtually free of the structures corresponding to the vinylidene olefins.

In one aspect the present invention contemplates the foregoing improvement of organic aluminum compounds by deliberately converting them into olefins typically by displacement with ethylene to form triethyl aluminum as a preliminary process step before performing the foregoing isomerization reaction first step thereby providing a three step process of displacement-selective olefin isomerization and olefin conversion to aluminum trialkyls.

One particularly useful example of the present invention is in connection with the process of U.S. Patent 3,415,861, the disclosure of which is herein incorporated by reference.

In that process the first step of displacement and the third step of olefin conversion to aluminum alkyls are performed in a single environment of a complex plural loop system. The incorporation of the present invention in such a system is readily accomplished in one respect by merely adding the selective isomerization step to one of the "loops."

Typically by way of example, the principles of the present invention are applied to four streams in FIG. 2 of U.S. Patent 3,415,861. These include the olefins of lines 35 and 53 fed to the main peaking displacements. As an alternate the isomerization is applicable to the feed to fractionation 29. Other points of application of the present process are to the recovery operations of the purge streams 31 and (80 plus 30a). In various combinations of these streams and precursors, it is evident that from one to four (or more) separate isomerizations are usable. In addition, the selective isomerization is frequently advantageously employed in connection with the chain growth reactors 11, 45 and 111, particularly the latter because of the recycle of olefins, the chain growth reactors performing the selective addition reactions, The purification at this point is a useful factor to avoid the generation of remotely branched primary alkyl aluminum compounds and consequent production of remotely branched alpha olefins in the ethylene displacement operation at 117.

Description of terminology

Terms used in the specification and claims are defined and recitations made of equivalents.

The prefix "hydrocarbo" refers to any hydrocarbon radical. It includes aliphatic, alicyclic, aromatic, polycyclic, and mixed materials such as alkaryl and aralkyl. It includes saturated and unsaturated, with various unsaturation aspects such as olefinic, dienic, acetylenic.

The term "hydrocarbo aluminum" includes compounds with one or more valence bonds of the aluminum bond to a hydrocarbon radical. It embraces the term "trihydrocarbo aluminums" wherein all bonds of the metal are to hydrocarbon radicals, a typical example being tri-isobutyl aluminum. It embraces compounds containing bonds of the aluminum to hydrogen such as di-isobutyl aluminum hydride, which exemplifies the dihydrocarbo aluminum hydrides.

The hydrocarbon radicals are those which contain from about four to about thirty carbon atoms per radical, including propyl radicals, isomeric as well as normal.

Equivalent compounds of other metals include compounds of Groups II–A, II–B, III–A, IV–A, and V–A of the Periodic Table (Fisher Scientific Co., 1955). Of these particularly preferred compounds are Group III–A compounds, particularly boron, and magnesium and silicon.

Typical hydrocarbo aluminum compounds are the trihydrocarbo aluminums: tri-isobutyl aluminums, tri-n-butyl aluminums, tri-isopropyl aluminums, tri-n-propyl aluminums, tri-n-hexyl aluminums, tri-n-octyl aluminums, tri-n-decyl aluminums, tri-n-dodecyl aluminums, tri-n-tetradecyl aluminums tri-n-eicosyl aluminums, and tri-n-triacontyl aluminums. Other typical hydrocarbo aluminum compounds are similar dihydrocarbo aluminum hydrides such as di-isobutyl aluminum hydride. Other typical equivalent compounds are butyl borons, butyl magnesiums, butyl silicons, butyl zincs, butyl galliums, butyl lithium, butyl mercuries, butyl leads, and butyl titaniums.

Because of the splitting-off of hydrocarbon radicals from organometallic compounds to form metal-hydrogen bond compounds while liberating olefins, the olefins usable in the present process generally are olefins corresponding in respect to carbon structural configuration to the hydrocarbon radicals previously exemplified. Thus a n-butyl hydrocarbon radical splitting-off from aluminum produces butene-1; while butene-1, adding to a hydrocarbo aluminum hydride such as diisobutyl aluminum hydride produces diisobutyl, n-butyl aluminum and so forth.

Ethylene

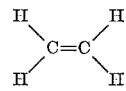

is most reactive to addition and is difficult to split-off from ethyl aluminums.

Vinyl olefins

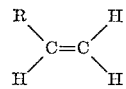

are highly reactive to addition and split-off with moderate ease from corresponding alkyl aluminum compounds. R typically is a saturated alkyl structure of straight chain with 4–30 carbon atoms. Unsaturation, branching and other variations do not disqualify a R radical of this and the subsequent formulas from being called generically alkyl, because such variations merely require the consideration of the principles exemplified in two or more formulas.

Vinylidene olefins

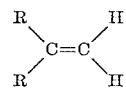

are moderately reactive to addition to form alkyl aluminum compounds and split-off readily forming olefins. R's are as previously defined.

Internal olefins

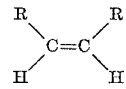

are poorly reactive to addition to form alkyl aluminum compounds and usually split-off readily, particularly if in competition with vinyl olefins.

Tri-substituted ethylenes

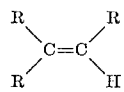

are less reactive to addition than internal olefins and split-off readily.

The foregoing classification of olefins provides the standards for ascertaining the characteristics of all molecules with various forms and degrees of unsaturation, branching, cyclic structures and the like. Thus hydrocarbo aluminum compounds with unsaturated radicals or branched radicals are predictable as to relative reactivities and relative reactivities of unsaturate linkages of different types in the same hydrocarbon molecule on a basis of the relative addition and splitting-off properties of the individual structures.

From the classification one can see that tri-substituted ethylenes are less reactive than vinylidene olefins so that of a mixture of olefins or of a molecule that contains both structures, the vinylidenes add preferentially.

Vinyl olefins

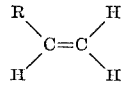

react preferentially in the presence of vinylidene olefins forming the basis for the aforementioned U.S. Patent 3,291,853. The preferentiality is not particularly great and in any event is far less than the preferentiality between vinyl olefins and tri-substituted ethylenes.

Vinylidene olefins are also described herein as 1,1-dialkyl ethylenes or as proximately branched alpha olefins because the branching is at a carbon atom which forms a part of the olefinic linkage. The relationship is readily seen from the formula:

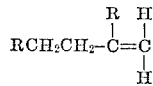

The terms "proximately" and "remotely" are used to differentiate between the vinylidene type of branched alpha olefins and alpha olefins in which the branching is at a carbon atom at least one removed from the carbon atom of the olefinic linkage.

Such remotely branched alpha olefins are characterized by the formulas

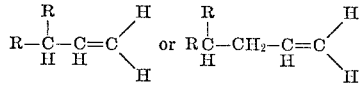

In the isomerization and displacement reactions of the present invention, the vinyl olefins and the remotely branched alpha olefins have substantially similar reactivities and hence are not differentiated. On the other hand, if the remotely branched alpha olefins arise through chain growth of ethylene upon an isomeric primary alkyl such as isobutyl aluminum or isohexyl aluminum, then the application of the principles of the present invention to convert the branched structures to the tri-substituted ethylenes to avoid the addition of such to aluminum-hydrogen bonds in the first instance will minimize the quantity of such isomeric radicals that are subjected to growth. Thus the application of the principles of the present invention, particularly in recycle systems such as those of U.S. Pat. No. 3,415,861 does provide a material reduction in the quantity of remotely branched hydrocarbo aluminum radicals present in hydrocarbo aluminum compounds such as the alkyl aluminum, and alkoxy aluminum compounds of U.S. 3,415,861 as well as the proximately branched (2-branched) and remotely branched (3 and 3-plus branched) primary alcohols produced after hydrolysis of the aluminum alkoxide compounds, as in U.S. Pat. No. 2,892,858.

Typical preferred vinyl olefins treated in accordance with the present process are alpha olefins of unbranched carbon skeleton configuration having from about three to about thirty carbon atoms per molecule. Such olefins are represented by the formula $RCH=CH_2$ where R is straight chain unsubstituted alkyl having from 1 to about 28 carbon atoms with terminal linkage to the balance of the molecule.

Such molecules are preferred because they do not undergo side or multiple reactions; however, where such side reactions are not undesired, equivalent olefins of this type for the reaction of the present invention include those in which R contains cyclic, aromatic, branched, unsaturated, internal carbon atom linkage to the balance of the molecule and like structures as well as substitution, which does not react adversely with the present catalysts. For the present invention, substitution in R with a straight chain alkyl group at a carbon atom more remote than the 2-carbon atom is substantially equivalent to vinyl olefin structures.

Typical vinyl olefins are butene-1, pentene-1, dodecene-1, hexadecene-1, tetracosane-1, triacontene-1.

Others are: 3-ethyl octene-1, 5-methyl decene-1.

Typical preferred vinylidene olefins are similar to the foregoing vinyl olefins represented b ythe formula

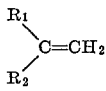

including cyclic structures of $R_1$, $R_2$ and $C_2$. They also may be designated as 2-branched α-olefins. $R_1$ and $R_2$ have from 1 to about 27 carbon atoms each to a total of $R_1$ and $R_2$ of about 28 carbon atoms.

Typical vinylidene olefins are: 2-methyl propene-1, 2-ethyl hexene-1, 2-butyl decene-1, isobutene.

Typical preferred internal olefins are similar to the foregoing vinyl olefins and vinylidene olefins represented by the formula $RCH=CHR$.

Typical internal olefins are butene-2, octene-2, octene-3, octene-4, decene-2, dodecene-3, eicosene-4, triacontane-3.

Typical preferred aluminum-hydrogen bond reactants for the selective reaction of the foregoing vinyl olefins are triisobutyl aluminum, tri-n-propyl aluminum, tri-n-butyl aluminum, and diisobutyl aluminum hydride. A preferred reactant is a chain growth aluminum alkyl mixture with alkyl groups ranging from about ethyl to about eicosyl, predominantly straight chain primary but with a significant percentage of 2-branched primary groups. Such is typically a mixture of alkyls as obtained from chain growths 11, 45 and 111 of FIG. 2 of U.S. Pat. No. 3,415,861.

Other hydrogen-bond compounds are equivalent boron compounds such as tri-isobutyl boron, tri-n-propyl boron, tri-n-butyl boron, and diisobutyl boron hydride.

Other hydrogen-bond compounds are equivalent compounds of zinc, cadmium, mercury, gallium, indium, tantalum, silicon, germanium, tin, lead, phosphorous, arsenic, antimony and bismuth.

SELECTIVE ISOMERIZATION

Typical catalysts useful in the selective isomerization of vinylidene olefins to tri-substituted ethylenes include packed beds or slurry systems of silica gel, silicated alumina, crystalline alumino silicates (molecular sieves), activated alumina, ion exchange resins, acid clays such as montmorillonite, attapulgite, modenite, diatomaceous earth, and so forth.

Of all the foregoing, the highly acidic materials generally have high initial reactivity; however, they are deactivated at an undesirably high rate by traces of impurities so that those materials of moderate acidity such as silica gel, activated alumina, and acidic clays are generally preferred both from a long term activity point of view and from a low cost viewpoint.

Typical temperatures used in the reaction range from about 0° C. to about 200° C., a more preferred range being from about room temperature to about 140° C., typical temperatures being 55° C., 95° C., 75° C., 85° C., and 110° C. Liquid space velocities used in packed towers range from about ⅓ to about 2 volumes/volume of tower per hour figured on a cross section thereof without packing material present. Similar contact times are used in slurry or batch systems. Typically, the pressures used in the reaction are atmospheric or autogeneous depending upon the materials involved. Catalysts are readily regenerated by heat treatment. Catalyst life depends to a large extent upon the water content of the feed olefins, typically running 1000 hours or better. In instances where a catalyst life of 1000 hours is obtainable using the preferred low cost catalyst materials set forth in the foregoing, it is generally practical to discard the catalyst after a single use and refill with fresh catalyst. It is evident that the foregoing conditions, although important, are not "threshold critical" and are generally influenced to some degree by physical properties and, in some instances, the minimizing of side reactions.

In instances where catalyst life is a particular problem due to the presence of moisture or other contaminants such as alcohols or residual basic or alkaline reagents, it is useful to employ a guard bed technique of a catalyst charge from a previous run placed in the flow path ahead of the principal catalytic bed in either a batchwise operation or in a continuous flow system.

Examples of specific commercially available catalysts are:

Silica gel—Grace Davison Division
    Grade 407
    Davison Code No. 407–08–05–215
    Mesh size—8–20
    CF=0.85
Silica alumina—Houdry—Code 24CP–6 and Code 511CP
    (Experimental catalysts)
Molecular sieves—Type 4A—1⁄16" pellets—Fisher label from Linde Air Products Corp. of Union Carbide
Activated alumina—A541—8–14 mesh
Ion exchange—Rexyn—101—(H)
    Sulfonated polystyrene copolymer, hydrogen form
    Active Group—$H_2SO_3^-$
    Ion form $H^+$ (95 percent minimum)
    Mesh size—40–100—(Fisher label)

Isomerization times are from about 0.01 to about 100 hours with about ½ to about 3 hours preferred.

In addition to the foregoing solid catalyst systems for the isomerization of the olefins, the reaction per se can be performed in aqueous systems employing acidic catalysts such as a compatible acid such as sulfuric acid, phosphoric acid, in aqueous systems such as a 20 to 90 weight percent sulfuric acid solution with water. The reaction is typically performed at about room temperature under autogeneous pressure under which conditions in a period of from about 1 to 2 hours equilibrium is attained which is usually 90 percent or better of the trisubstituted olefins. In particular, those olefins having from about 10 to about 20 carbon atoms per molecule the equilibrium is generally from about 97 to about 98 percent trisubstituted in relationship to the total of the vinylidene and trisubstituted olefins in the starting feed mixture. The reaction using such aqueous acidic catalysis is generally enhanced by using some surface area extension material, such as ceramic or glass beads.

The problems and costs of drying of the olefins prior to the reaction with aluminum alkyl materials and of recovering the non-reactive internal olefins are significant in such aqueous isomerization systems. Such systems are not among the most preferred arrangements.

The foregoing reactions are performed with or without diluent or inert solvent media. Typical diluents are hexane, isooctane, petroleum ether, kerosene, benzene, toluene, and saturated ethers such as diethyl ether, di-n-butyl ether and the like.

The displacement operation is conducted in a more or less conventional manner for the particular vinyl olefins and aluminum alkyls fed and olefins and aluminum alkyls produced. In general, the countercurrent displacements under the conditions of temperature, pressure, etc. recited in U.S. Pat. 3,389,161 are preferred. The materials of that patent are herewith incorporated by reference.

The conditions of the various displacements of U.S. Pats. 3,384,651 and 3,415,861 also represent preferred conditions. The materials of those patents are herewith incorporated by reference.

A preferred high temperature short contact time displacement process is taught by U.S. Pat. 3,359,292. The materials of that patent are herewith incorporated by reference.

A useful high temperature displacement process is taught by U.S. Pat. 3,180,881. The materials of that patent are herewith incorporated by reference.

Other useful splitting, displacement or addition processes are taught by U.S. Patents 2,826,598; 2,835,689; 2,886,599; 3,013,043; 3,015,669; 3,087,953; and 3,207,771. The materials of these patents are herewith incorporated by reference.

Displacement temperatures are important but not critical except in the region above about 340° C. where adverse decompositions become appreciable, particularly when related to contact time and minimizing undesired side reactions such as dimerization and isomerization. Considerations in such respects are discussed fully in U.S. Patents 3,389,161 and 3,359,292 cited above. Temperatures range generally upward from about 70–80° C. of U.S. Patent 2,826,598 at contact times of about 24 hours, or longer such as six days. Contact time is, generally speaking, a non-critical dependent variable resulting from the desired degree of approach to equilibrium for the particular materials involved in any given system. In general, the longer the contact time at a given temperature with a particular system, the greater the amount of side reactions, and in this ancillary respect the contact time has one aspect of criticality. The relationship approaching criticality for optimum results are discussed fully in the two patents cited in this paragraph.

Maximum temperatures are generally limited by decomposition of the aluminum alkyls in heat transfer systems such as those of U.S. 3,180,881 ranging up to about 340° C. at contact times of about 0.1 to 10 seconds.

Maximum temperatures are generally limited by decomposition of olefins as well as aluminum alkyls in sensible heat utilization systems such as those of U.S. Patent 3,359,292 providing maximum feed olefin temperatures of 700° F. (about 371° C.) and maximum displacement temperatures of 650° F. (about 343° C.) with mixing of the feed olefins and feed aluminum alkyls in about 1 to 50 percent of a total contact period of about 0.1 to 5 seconds.

Thus the displacement temperatures range broadly from about 70° C. to about 371° C. with contact times ranging from about a week to about 100 milliseconds.

Displacement catalysts such as nickel and titanium in elemental, alloy, organic compound, deposited or otherwise form are possibly useful in some instances as discussed by some of the patents cited; however, for the most part embodiments using such are not the most preferred ones.

The ratios of olefins to first hydrocarbo aluminum compounds fed to displacement in a given system are discussed quite fully in U.S. Patents 3,384,651 and 3,415,861. Relationships of equilibria, differences in statistical rates of splitting-off and of addition, as well as boiling points, melting points, relative volatilities, vaporization removal of certain by-products such as butylenes etc. are known or readily ascertainable. In general, a numerical excess of molecules of olefin feed relative to three times the number of aluminum molecules present in Al-H bonds or al-hydrocarbon bonds is desirable. The ratios providing the most desirable numerical excess are typically in the range from about 3:1 to about 10:1; however, a broader range from about 1:1 to about 100:1 is reasonable. The lower ranges up to about 3:1 are generally preferred where one of the products is readly flashed from the system such as where by-product butenes are obtained through the use of butyl aluminums as feed to the displacement systems. The intermediate ranges from 3:1 to about 10:1 are preferred for maximum control over the molecular weights of the product aluminum alkyls, for cost considerations in volumes of circulating streams. The upper ranges from 10:1 to 100:1 are desirable for effect in the elimination of the proximately branched olefins and the hydrocarbon radicals corresponding to them in terms of carbon skeleton configuration but do climb rapidly in this region.

These ratios represent molecules of olefins per molecule of aluminum present in organo aluminum or organo aluminum hydride form.

In general, the ratios are based on vinyl olefin content of the olefin feeds supplied to the first step. Minor quantities of the vinyls, usually less than 2 percent are occasionally lost in the first step. Normally this is disregarded. On the other hand, an excess of aluminum compound present relative to the vinyl olefins may result in the addition of residual 1,1-dialkyl ethylenes and even of internal olefins. Thus, one usually seeks to use at least a 1:3 ratio of vinyl olefin molecules to aluminum molecules in the feeds to the second step.

EXAMPLE I

An olefin sample was selected having the following content

Olefins
(molecular weight):                     Mol percentage

| | |
|---|---|
| Decenes | Trace |
| Dodecenes | 47.4 |
| Tetradecenes | 31.6 |
| Hexadecenes | 21.0 |
| | 100.0 |

Analysis was by vapor phase chromatography.

Olefins (type):                     Mol percentage

| | |
|---|---|
| Straight chain alpha (vinyl) | 56.0 |
| 1,1-dialkyl ethylenes (vinylidene) | 14.0 |
| Internal olefins (all varieties) | 30.0 |
| | 100.0 |

Analysis techniques included vapor phase chromatography and NMR (nuclear magnetic resonance). Water content—20 parts per million.

A tower of approximately 600 cc. open volume and internal diameter of ½ inch was packed with silica gel of 8–20 mesh size of a standard commercial type identified in the preceding discussion as Davison Grade 407. The foregoing olefin was fed through the packed tower at a liquid hourly space velocity (LHSV) of 2.0 based on the tower considered as open (600 cc.) space. The operation was continuous for a time period of 800 hours. The temperature was 95° C. The pressure was atmospheric.

Samples were taken periodically and analyses made with foregoing techniques. Initial analyses showed that the 1,1-dialkyl ethylenes

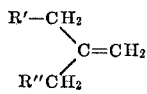

content of the feed olefins was isomerized to the corresponding tri-substituted ethylenes (branched internal olefins); viz,

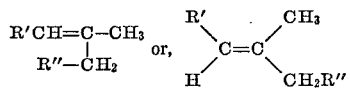

and

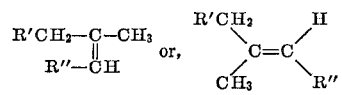

to give about 95 percent trisubstituted and 5 percent 1,1-dialkyl ethylenes from the initial 14 percent 1,1-dialkyl ethylenes. The equilibrium is about 97 percent trisubstituted. The vinyl olefins and the internal olefins, except for the increase in internals due to the trisubstituted ethylenes, did not change. Analysis showed virtual freedom from dimerization of olefins.

At the end of the 800 hour period the analyses showed that the conversion had dropped off significantly but the effluent still showed a conversion of about 40 percent of the 1,1-dialkyl ethylenes to the corresponding trisubstituted olefins.

A composite of the foregoing isomerized olefin was collected in which 90–95 percent of the 1,1-dialkyl ethylenes had been isomerized to trisubstituted ethylenes. This sample was then subjected to a batch displacement reaction with triisobutyl aluminum at a temperature of about 110° C. The displacement reactor was equipped with a reflux condenser that allowed the escape of isobutene which was collected and measured. The TIBA and olefins were reacted in a 1:3 mol ratio based on the vinyl olefin content.

The resulting aluminum alkyl compounds were oxidized to aluminum alkoxides and the alkoxides were hydrolyzed to alcohols. The alcohols were analyzed by vapor phase chromatography, NMR and other techniques.

Alcohols similarly prepared from similar starting olefins without the isomerization step show about 5 times the amount of branched alcohol content as the alcohols from the preceding.

EXAMPLE II

Example I was repeated at 75° C. isomerization temperature. Similar results were obtained.

EXAMPLE III

Example I was repeated at various liquid hour space velocity (LHSV) from ½ to 2. Similar results were obtained.

EXAMPLE IV

Example I was repeated at temperatures of 100° C. and 120° C. at shorter residence times with liquid hour space velocity (LHSV) from 2 to about 3. Similar results are obtained.

EXAMPLE V

Example I was repeated with Silica Alumina catalyst, typically Houdry Code 24 CP-6. Operation was at 60° C. Similar results were obtained. After 240 hours the isomerization was approximately 80 percent of the vinylidene olefins converted to tri-substituted ethylenes. The catalyst performance with time was quite similar to that of Example I.

EXAMPLE VI

Example I was repeated with a different olefin feed. The olefins were obtained by chain growth with ethylene on triethyl aluminum followed by ethylene displacement. The following shows specific data relative to comparative branching in the alcohol product with and without the isomerization step.

| | Primary alcohols, percent branched | |
|---|---|---|
| | With isomerization | Without isomerization |
| 1-dodecanol | 2.12 | 5.1 |
| 1-tetradecanol | 3.02 | 12.0 |
| 1-hexadecanol | 7.00 | 22.9 |
| 1-octadecanol | 16.30 | 29.3 |

This experiment was intended to show comparative data for individual alcohol molecular weights. There was no attempt to optimize either isomerization or displacement. The improvement is generally more significant at the higher molecular weights reflecting the vinyl olefin purity of starting olefins which characteristically decreases at the higher molecular weights in most olefin processes and with chain growth in particular.

EXAMPLE VII

Example I was repeated with activated alumina 8–14 mesh. Substantially complete conversion of the vinylidene olefins to trisubstituted ethylenes of similar molecular weight was obtained with negligible deterioration of co-present vinyl olefins.

EXAMPLE VIII

Example VII was repeated with a 4A molecular sieve. Similar results were obtained.

EXAMPLE IX

Example I was repeated with Silica Alumina 511 CP (Houdry). Similar results were obtained.

EXAMPLES X–XXII
[Example I was repeated and analyses made]

| | Temp. (° C.) | Residence time (hours) | Olefins mol percent | | |
|---|---|---|---|---|---|
| | | | Vinyl | INT | Vinylidene |
| Feed | | | 65.6 | 20.3 | 14.1 |
| Example: | | | | | |
| X | 85 | 0.33 | 72.5 | 17.5 | 10.1 |
| XI | 85 | 0.5 | 68.5 | 21.5 | 10.1 |
| XII | 85 | 0.67 | 68.2 | 21.5 | 10.3 |
| XIII | 85 | 0.67 | 67.9 | 21.8 | 10.7 |
| XIV | 85 | 1.5 | 69.0 | 21.8 | 7.2 |
| XV | 30 | ¹72.0 | 74.8 | 23.8 | 1.4 |
| XVI | 30 | ¹70.0 | 73.1 | 23.2 | 3.7 |
| XVII | 100 | 0.67 | 67.0 | 21.1 | 11.9 |
| XVIII | 30 | ¹18.0 | 70.5 | 23.2 | 6.3 |
| XIX | 65 | 6.0 | 66.9 | 21.6 | 11.5 |
| XX | 30 | ¹18.0 | 72.4 | 23.5 | 4.1 |
| XXI | 100 | 1.5 | 71.4 | 23.5 | 5.1 |
| XXII | 25 | ¹96.0 | 75.0 | 24.3 | 0.7 |

¹ Batch.

These examples represent sequential runs in the same catalyst charge.

EXAMPLES XXIII–XXXIV
[Example I was repeated and analyses made]

| | Temp. (° C.) | Residence time (hours) | Olefins, mol percent | | |
|---|---|---|---|---|---|
| | | | Vinyl | INT | Vinylidene |
| Feed | | | 66.6 | 21.5 | 11.9 |
| Example: | | | | | |
| XXIII | 25 | ¹18.0 | 75.2 | 24.8 | 0.0 |
| XXIV | 55 | 2.0 | 74.0 | 24.4 | 1.6 |
| XXV | 25 | ¹16.0 | 74.4 | 25.6 | 0.0 |
| XXVI | 55 | 4.0 | 74.3 | 24.5 | 1.2 |
| XXVII | 25 | ¹16.0 | 74.8 | 25.2 | 0.0 |
| XXVIII | 55 | 6.0 | 73.6 | 24.3 | 2.0 |
| XXIX | 55 | 6.0 | 74.9 | 23.9 | 1.2 |
| XXX | 55 | 1.0 | 71.6 | 22.6 | 5.8 |
| XXXI | 55 | 1.0 | 69.7 | 21.9 | 8.3 |
| XXXII | 55 | 1.0 | 69.3 | 22.0 | 8.7 |
| XXXIII | 55 | 2.0 | 70.5 | 22.6 | 6.8 |
| XXXIV | 55 | 2.0 | 71.4 | 22.9 | 5.7 |

¹ Batch.

These examples represent sequential runs in the same catalyst charge which was fresh at the start of Example XXIII.

EXAMPLES XXXV-XLI
[Example I was repeated and analyses made]

| Example: | Temp. (° C.) | Residence time (hours) | Olefins, mol percent | | |
|---|---|---|---|---|---|
| | | | Vinyl | INT | Vinylidene |
| Feed | | | 56.4 | 30.6 | 13.0 |
| XXXV | 55 | 2.0 | 59.6 | 32.4 | 8.0 |
| XXXVI | 55 | 2.0 | 59.7 | 32.5 | 7.8 |
| XXXVII | 55 | 2.0 | 59.4 | 32.3 | 8.3 |
| XXXVIII | 55 | 2.0 | 58.9 | 31.8 | 9.4 |
| XXXIX | 55 | 2.0 | 58.8 | 32.1 | 9.1 |
| XL | 55 | 2.0 | 58.1 | 31.5 | 10.4 |
| XLI | | | 59.2 | 32.1 | 8.7 |

These examples represent sequential runs in the same catalyst charge fed fresh at the start of Example XXIII. Example XLI is a composite of the product of all Examples X-XLI.

EXAMPLE XLII

Silica gel used from previous examples was regenerated by treatment with methanol at elevated temperatures of about 120° C. The methanol was removed under vacuum. The regenerated catalyst was tested as in previous examples and found to be similar to new catalyst.

EXAMPLE XLIII

Example I was repeated with ion exchange resin Rexyne 101 H. Similar results were obtained.

EXAMPLE XLIV

Example I was repeated in a glass flask at room temperature and atmospheric pressure using about 10% by weight of a 80 wt. percent $H_2SO_4$—20% water solution for 1½ hours. The mixture went to about 95:1 mol ratio of vinylidene olefins to tri-substituted ethylenes.

The product is dried, reacted conventionally with TIBA, and subjected to oxidation, stripping removal of volatiles from the trialkoxides and hydrolysis to provide alcohols which are further readily classified and identified by vapor phase chromatography and nuclear magnetic resonance techniques.

EXAMPLE XLV

Example XLIV is repeated using other concentrations of aqueous sulfuric acid ranging from about 75 to about 90% $H_2SO_4$ and proportions of acid solution to olefin ranging from about 10:1 to 1:10 parts by volume and at different times from about ¼ to 5 hours. Similar results are obtained.

EXAMPLE XLVI

Example XLIV and XLV are repeated using various concentrations and ratios of phosphoric acid isomerization catalyst. Similar results are obtained.

EXAMPLE XLVII

In a series of specific examples, preceding examples are repeated with various combinations of the materials disclosed herein including equivalents. Similar results are obtained.

Other feed olefins classified with respect to molecular weight: olefins having from about 4 to about 30 carbon atoms per molecule, pure and in various molecular weight combinations including standard commercial mixtures exemplified as having from about 6 to about 20 carbon atoms per molecule, having from about 6 to about 10 carbon atoms per molecule, having from about 10 to 16 carbon atoms per molecule, and having from about 16 to 20 carbon atoms per molecule, and the like.

Olefins with various prior processing histories: From chain growth or polymerization via aluminum chemistry, via boron chemistry, via magnesium chemistry, from thermal dehydrogenation, from catalytic dehydrogenation, from dehydrohalogenation, from wax cracking, from the oxo process, from dehydration of alcohols.

Olefins of various skeleton configurations: mixtures of vinyl olefins and vinylidene olefins with or without any or any combination or all of straight chain internal olefins, remotely branched internal olefins, tri-substituted ethylene type olefins in various proportions ranging over mol ratios of 100:1 to 1:100 of vinyl olefins to vinylidene olefins and of from about 100:1 to 1:100 of internal olefins to alpha olefins.

Other first hydrocarbo aluminum compounds and equivalents are used in the selective splitting-off, or displacement or addition reacting operation step. The apparatus is proportioned to accommodate the vapor pressures involved at the temperatures and the various relative volatilities involved in reactants and products. The materials are used pure and in various mixtures. Typical are diisobutyl aluminum hydride, di-n-butyl hydride, tri-n-butyl aluminum, trihexyl aluminum, triisohexyl aluminum, tri-n-dodecyl aluminum, tri-2-ethyl hexyl aluminum, tri-3-methyl hexyl aluminum, trieicosyl aluminum, tri triacontyl aluminum. Others are mixtures of $R_3Al$ where R is mixed unbranched straight chain saturated aluminum trialkyls, having from about 4 to about 30 carbon atoms per alkyl radical, proximately branched saturated aluminum trialkyls having from about 4 to about 30 carbon atoms per alkyl radical, remotely branched saturated aluminum trialkyls having from about 4 to about 30 carbon atoms per alkyl radical. Others are similar alkyls to those of the foregoing sentence with the number of carbon atoms per alkyl radical ranging from about 6 to about 10. Others with the preceding sentence range from about 10 to 16, or 16-20, or 6 to 16. Others are similar compounds of appropriate mono, di-, tri-, tetra or pentavalent organic lithium, beryllium, magnesium, titanium, zinc, cadmium, mercury, gallium, indium, tantalum, silicon, germanium, tin, lead, phosphorous, arsenic, antimony, bismuth, boron and lead. Similar desirable results are obtained.

Other isomerization catalysts used are: various acid activated and other clays including or derived from the montmorillonites, viz., sodium, potassium, lithium, calcium and other bentonites, such as Wyoming bentonite, magnesium bentonite (hectorite), saponite, nontronite, attapulgite, illite, zeolites, fuller's earths, and diatomaceous earths. Similar desirable results are obtained.

I claim:

1. In a process for producing first hydrocarbo aluminums in which the hydrocarbon radicals thereof have from about 4 to about 30 carbon atoms each and in which the hydrocarbon radicals are linked to aluminum via a terminal carbon atom by a reaction of vinyl olefins with different second hydrocarbo aluminums in which the hydrocarbon radicals thereof have from about 4 to about 30 carbon atoms each, the improvement wherein the vinyl olefins supplied contain at least a detectable percentage of vinylidene olefins and the mixture of olefins is first subjected to a selective catalytic isomerization at a temperature from about 0° C. to about 200° C. for a period of time from about 0.01 to about 100 hours with an acidic isomerization catalyst whereby the vinylidene olefins are substantially selectively converted to tri-substituted ethylenes, leaving the vinyl olefins substantially unchanged and then secondly, the olefins from the first step are subjected to a selective reaction with the second hydrocarbo aluminums whereby the vinyl olefins add to aluminum-hydrogen bonds of the aluminums to form first hydrocarbo aluminums while the tri-substituted ethylenes do not add to aluminum.

2. The process of claim 1 including additionally the third step of recovering the olefins that are left unreacted after the second step of the process claimed in claim 1.

3. The process of claim 1 wherein the acidic isomerization catalyst is silica gel.

4. The process of claim 1 wherein the acidic isomerization catalyst is acid activated clay.

5. The process of claim 1 wherein the acidic isomerization catalyst is silicated alumina.

6. The process of claim 1 wherein the acidic isomerization catalyst is aqueous sulfuric acid of from about 75 to about 90 percent acid by weight.

7. The process of claim 1 wherein the temperature of the isomerization step is from about room temperature to about 140° C.

8. The process of claim 1 wherein the isomerization catalyst is silica gel and the temperature is from about 55 to about 110° C.

9. The process of claim 1 wherein the isomerization time is from about ½ to about 3 hours.

10. The process of claim 1 wherein the vinyl olefins supplied to the first step have from about 6 to about 20 carbon atoms per molecule and contain vinylidene olefins in a molecular ratio ranging from about 100:1 to about 1:100 and internal olefins in a molecular ratio of from about 100:1 to about 1:100.

11. The process of claim 1 wherein the second hydrocarbo aluminums is a triiso alkyl aluminum compound or a diiso alkyl aluminum hydride compound and the temperature of the reaction of said second hydrocarbon aluminums is about 70–340° C.

12. The process of claim 1 wherein the second hydrocarbo aluminums is diisobutyl aluminum.

13. The process of claim 1 wherein the second hydrocarbo aluminums is diisobutyl aluminum hydride.

14. The process of claim 1 wherein second hydrocarbo aluminums is diethyl aluminum hydride.

15. In a process for producing trialkyl aluminum compounds containing predominantly straight chain carbon skeleton structure hydrocarbon radicals of about 4 to 30 carbon atoms with terminal carbon atom linkage of the radicals to aluminum from feed reactants including supplied vinyl olefins having from about 4 to about 30 carbon atoms per molecule and containing vinylidene olefins, the improvement wherein the olefins supplied are first subjected to a selective catalytic isomerization at a temperature from about 0° C. to about 200° C. for a period of time from about 0.01 to about 100 hours with an acidic isomerization catalyst whereby the vinylidene olefins are substantially selectively converted to tri-substituted ethylenes, leaving the vinyl olefins substantially unchanged, and then secondly, the olefins from the first step are subjected to a selective reaction with triisobutyl aluminum wherein the vinyl olefins add to aluminum to produce the said trialkyl aluminum compounds and tri-substituted ethylenes do not add to aluminum.

16. The process of claim 15 wherein the vinyl olefins also contain internal olefins in addition to the vinylidene olefins, the internal olefins having from about 4 to about 30 carbon atoms per molecule and wherein the mol ratio of triisobutyl aluminum (i–C$_4$H$_9$)$_3$Al relative to vinyl olefins used in the second step is about 1:3.

17. In a process for producing first trialkyl aluminum compounds containing predominantly straight chain carbon skeleton structure hydrocarbon radicals of about 4 to 30 carbon atoms with terminal carbon atom linkage of the radicals to aluminum from
(A) supplied vinyl olefins having from about 4 to about 30 carbon atoms per molecule containing vinylidene olefins wherein the ratio of vinylidene olefins to vinyl olefins is higher than the desired ratio of straight chain hydrocarbon radicals to branched chain hydrocarbon radicals in the product trialkyl aluminum compounds,
(B) and second trialkyl aluminum compounds having from about 4 to about 30 carbon atoms per hydrocarbon radical and wherein the hydrocarbon radicals have a lesser percentage content of straight chain carbon skeleton structure radicals than desired in the first trialkyl aluminum compounds, the improvement wherein the supplied vinyl olefins A are first subjected to a selective catalytic isomerization at a temperature from about 0° C. to about 200° C. for a period of time from about 0.01 to about 100 hours with an acidic isomerization catalyst whereby the vinylidene olefins contained in the vinyl olefins supplied are substantially selectively converted to trisubstituted ethylenes, and then secondly, the olefins from the first step are subjected to a selective reaction with said second trialkyl aluminum compounds B wherein the vinyl olefins add to aluminum to produce the said first trialkyl aluminum compounds and the tri-substituted ethylenes do not add to aluminum.

18. The process of claim 17 wherein the supplied vinyl olefins A are predominantly olefins of from about 6 to about 10 carbon atoms per molecule, wherein the mol ratio of vinyl olefins in A relative to mols of aluminum in the second trialkyl aluminum compounds B is from about 3:1 to about 10:1, and wherein the second reaction provides
(C) first trialkyl aluminum compounds which are peaked in molecular weight in hexyl, octyl and decyl hydrocarbo aluminum compounds relative to the second trialkyl aluminum compounds and wherein they contain a higher percentage of unbranched hydrocarbo radicals than the second trialkyl aluminum compounds, and
(D) olefins containing:
  (1) the unreacted tri-substituted ethylenes produced in the isomerization step, and
  (2) excess unreacted vinyl olefins remaining from the effluent olefins fed which are depressed relative to the olefins A in content of hexenes, octenes and decenes.

19. The process of claim 17 wherein the isomerization catalyst is silica gel and the second trialkyl aluminum compounds are the product of a chain growth reaction of ethylene on a lower trialkyl aluminum compound, said second trialkyl compounds having from about 4 to about 30 carbon atoms per molecule.

20. The process of claim 17 wherein the supplied olefins are predominantly olefins of from about 12 to about 16 carbon atoms per molecule, wherein A relative to mols of aluminum in B is from about 3:1 to about 10:1, and wherein the second reaction provides first trialkyl aluminum compounds which are peaked in molecular weight in dodecyl, tetradecyl and hexadecyl hydrocarbo aluminum compounds relative to the second trialkyl aluminum compounds and wherein they contain a higher percentage of unbranched hydrocarbo radicals than the second trialkyl aluminum compounds.

References Cited
UNITED STATES PATENTS

| | | | |
|---|---|---|---|
| 2,554,251 | 5/1951 | Hudson | 260—683.2 |
| 3,214,487 | 10/1965 | Mattox | 260—683.2 |
| 3,236,909 | 2/1966 | Winnick | 260—683.2 |
| 3,240,838 | 3/1966 | White et al. | 260—683.2 |
| 3,358,050 | 12/1967 | Acciarri et al. | 260—683.15 D |
| 3,424,810 | 1/1969 | Suatoni | 260—683.2 X |
| 3,180,881 | 4/1965 | Zosel. | |
| 3,291,853 | 12/1963 | Feighner et al. | |
| 3,389,161 | 6/1968 | Kottong et al. | |
| 3,415,861 | 12/1968 | Davis et al. | |

TOBIAS E. LEVOW, Primary Examiner

H. M. S. SNEED, Assistant Examiner